United States Patent
Jain

(10) Patent No.: US 10,050,824 B2
(45) Date of Patent: Aug. 14, 2018

(54) MANAGING A CLUSTER OF SWITCHES USING MULTIPLE CONTROLLERS

(75) Inventor: Nitin Jain, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 424 days.

(21) Appl. No.: 13/557,105

(22) Filed: Jul. 24, 2012

(65) Prior Publication Data

US 2013/0188514 A1 Jul. 25, 2013

Related U.S. Application Data

(60) Provisional application No. 61/589,273, filed on Jan. 20, 2012, provisional application No. 61/590,532, filed on Jan. 25, 2012.

(51) Int. Cl.
*H04L 12/24* (2006.01)
*H04L 29/12* (2006.01)
*H04L 12/18* (2006.01)

(52) U.S. Cl.
CPC ............ *H04L 41/042* (2013.01); *H04L 41/12* (2013.01); *H04L 61/103* (2013.01); *H04L 12/18* (2013.01)

(58) Field of Classification Search
CPC ..... H04L 41/12; H04L 41/042; H04L 61/103; H04L 12/28
See application file for complete search history.

(56) References Cited

U.S. PATENT DOCUMENTS

| | | | |
|---|---|---|---|
| 6,636,499 B1* | 10/2003 | Dowling | H04L 12/4625 370/338 |
| 6,788,692 B1* | 9/2004 | Boudreau et al. | 370/400 |
| 2002/0133622 A1* | 9/2002 | Pinto | 709/242 |
| 2004/0024855 A1* | 2/2004 | Tsai et al. | 709/223 |
| 2005/0027862 A1* | 2/2005 | Nguyen et al. | 709/225 |
| 2006/0198331 A1* | 9/2006 | Gurin | 370/313 |
| 2007/0233825 A1* | 10/2007 | Brownell et al. | 709/220 |
| 2012/0117438 A1* | 5/2012 | Shaffer | H04L 1/1825 714/749 |
| 2012/0271895 A1* | 10/2012 | Maenpaa et al. | 709/206 |
| 2013/0007335 A1* | 1/2013 | Jiang et al. | 710/316 |
| 2013/0060940 A1* | 3/2013 | Koponen et al. | 709/225 |
| 2013/0067066 A1* | 3/2013 | Dickens et al. | 709/224 |

* cited by examiner

*Primary Examiner* — Walter J Divito
(74) *Attorney, Agent, or Firm* — Stewart M. Wiener

(57) ABSTRACT

One embodiment of the present invention provides a computing system. The computing system includes a discovery module, a high-availability management module, and a controlling module. The discovery module determines local switch-specific information associated with a switch based on a discovery response packet. The high-availability management module determines remote switch-specific information about the same switch with respect to a remote computing system. The controlling module determines whether the computing system is to manage the switch based on a metric derived from the local and remote switch-specific information.

30 Claims, 12 Drawing Sheets

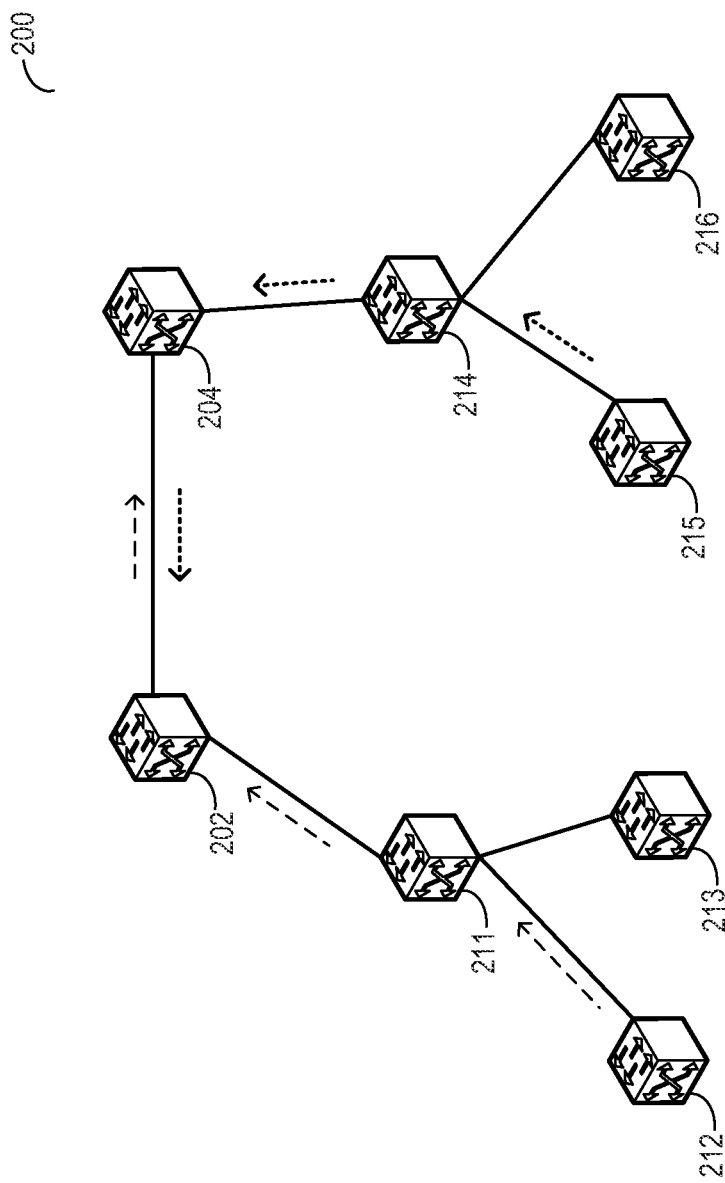

MANAGING A CLUSTER OF SWITCHES USING MULTIPLE CONTROLLERS

RELATED APPLICATIONS

This application claims the benefit of U.S. Provisional Application No. 61/589,273, titled "Method of Managing a Cluster Comprising a Group of Controllers Where Each is Managing Set of Switches," by inventor Nitin Jain, filed 20 Jan. 2012, and U.S. Provisional Application No. 61/590,532, titled "Method of Managing a Cluster Comprising a Group of Controllers Where Each is Managing Set of Switches," by inventor Nitin Jain, filed 25 Jan. 2012, the disclosures of each of which are incorporated by reference herein.

The present disclosure is related to U.S. patent application Ser. No. 13/487,932, titled "Managing a Large Network Using a Single Point of Configuration," by inventor Nitin Jain, filed 4 Jun. 2012, the disclosures of which are incorporated by reference herein.

BACKGROUND

Field

The present disclosure relates to network management. More specifically, the present disclosure relates to a method and system for providing high availability and license management to configuration managers in a network, wherein a respective configuration manager manages a plurality of switches.

Related Art

The growth of the Internet has brought with it an increasing demand for bandwidth. As a result, equipment vendors race to build larger and faster switches, each capable of supporting a large number of end devices, to move more traffic efficiently. However, the size of a switch cannot grow infinitely. It is limited by physical space, power consumption, and design complexity, to name a few factors. One way to meet this challenge is to interconnect a number of switches to support a large number of users. Managing such a large number of switches requires tedious and complex configurations on a respective switch, typically performed by a network administrator. Such configuration includes configuring interfaces on a respective switch and forwarding policies for the switch.

A large number of switches can be managed together by interconnecting these switches. Typically, a respective switch discovers the other interconnected switches to obtain a local view of the topology of these switches. A discovery method on a switch usually send discovery messages via all local interfaces (can be referred to as flooding) to discover the topology. All other switches in the network send a response back. Upon receiving the responses, the method discovers the switches and their topology. To consolidate the discovery process, one switch can discover the topology and share that information with the rest of the switches. However, the switch still floods the network to discover the topology. Furthermore, the switch typically employs unicast-based message exchanges to share any information with another switch. These messages are essentially part of the control traffic and do not contribute to the data traffic among the switches, while taking up significant bandwidth from the interconnecting links. As a result, network management through such messages is inefficient.

While managing a group of switches together brings many desirable features to a network, some issues remain unsolved for efficient network management and configuration.

SUMMARY

One embodiment of the present invention provides a computing system. The computing system includes a discovery module, a high-availability management module, and a controlling module. The discovery module determines local switch-specific information associated with a switch based on a discovery response packet. The high-availability management module determines remote switch-specific information about the same switch with respect to a remote computing system. The controlling module determines whether the computing system is to manage the switch based on a metric derived from the local and remote switch-specific information.

In a variation on this embodiment, the metric is one or more of: 1) load on the computing system, 2) bandwidth of the links coupled to the computing system, 3) a hop count between the switch and the computing system, and 4) a user-defined parameter.

In a variation on this embodiment, remote switch-specific information is contained in a cluster packet with a packet header of a reliable network protocol.

In a variation on this embodiment, the computing system also includes a packet processor which identifies a virtual identifier in a packet header. Furthermore, the virtual identifier comprises one or more of a virtual Internet Protocol (IP) address and a virtual Media Access Control (MAC) address.

In a further variation on this embodiment, the virtual identifier is associated with the computing system and the remote computing system.

In a further variation on this embodiment, the switch also includes a license management module which obtains a group license for the switch and constructs a frame containing the group license for the switch in conjunction with the packet processor.

In a variation on this embodiment, the computing system also includes an Address Resolution Protocol (ARP) module which responds to an ARP request for the virtual IP address with the virtual MAC address.

In a variation on this embodiment, the computing system also includes an identifier management module which assigns a unique identifier to the switch from a range of identifiers specific to the computing system.

In a variation on this embodiment, the controlling module also manages a second switch in response to detecting a failure of the remote computing system, wherein the second switch is previously managed by the remote computing system.

In a variation on this embodiment, the controlling module also creates a multicast group, wherein a respective member of the multicast group is managed by the computing system.

BRIEF DESCRIPTION OF THE FIGURES

FIG. 2B illustrates a controller using the hop count as a metric for cluster formation, in accordance with an embodiment of the present invention.

DETAILED DESCRIPTION

Figure 1A:
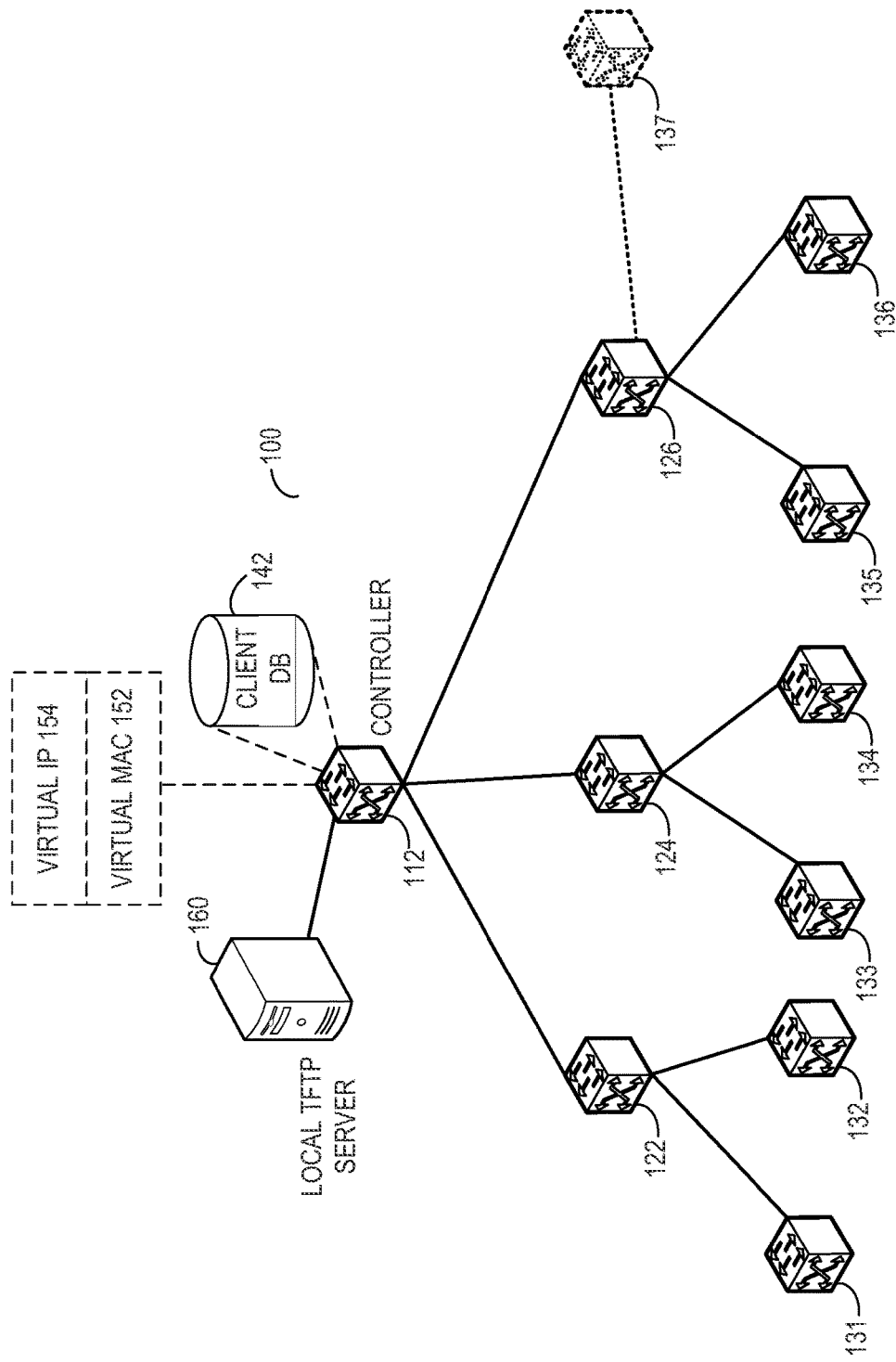
FIG. 1A illustrates an exemplary network with a controller as a single point of configuration, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of providing high availability and scalability while efficiently managing a network is solved by configuring a plurality of switches from a plurality of interconnected network managers. Managing a network typically requires configuring a respective switch of the network. Configuring every switch can be a tedious burden on the network administrator. Furthermore, if any misconfiguration is detected, the network administrator has to reconfigure every switch. Interconnecting these switches and managing them together can ease the burden on a network administrator. However, in order to manage these interconnected switches, a respective switch discovers the topology of these switches by flooding unicast-based discovery messages. All other switches send back a unicast-based response. These switches share information among themselves based on unicast messages as well. Consequently, the traffic caused by such message exchanges increases proportionally with the number of switches and links in the network. Furthermore, managing a large network from a single switch is limited by the bandwidth and processing power of the switch. As a result, the switch can become a bottleneck. Moreover, under such a scenario, the switch is a single point of failure. If the switch fails, the management and control plane of all the switches in the network fails as well.

To solve this problem, a group of controllers, which can be switches in a network, remotely discover and manage a plurality of switches interconnected in a network while sharing the information they learn from the network. Based on the shared information, a respective controller becomes aware of another controller's view of the network and manages a subset of the switches closest to the controller. In this way, management of a large number of switches remains scalable by distributing the responsibility of managing these switches among multiple controllers. Furthermore, if a controller fails, other controllers in the network can take over the responsibility of managing the switches that have been managed by the failed switch.

To enable a controller to manage a plurality of switches, all switches in the network can have a basic switch image. The switch image provides layer-2 connectivity to the corresponding switch and can be configured with a registration to a default all-switch multicast group. In some embodiments, at least one interface of a respective switch has a membership in a default virtual local area network (VLAN). As a result, a respective switch with a membership in the VLAN receives the messages sent to this default multicast group. To initiate the discovery process, a respective controller sends a group-specific discovery message to the group. This discovery message can be a multicast query message. A respective switch receives the message and sends a query response message via multicast to the default group. As a result, a respective controller in the network receives the response and becomes aware of the on-going discovery process. Note that if a switch receives discovery messages from multiple controllers, the switch responds to a respective controller. The data in the response message (can be referred to as the payload) contains switch-specific information, such as a switch identifier, the device type, the capability, the current image, etc. In some embodiments, the query message and the query response message can be Internet Group Management Protocol (IGMP) messages.

After discovering a switch, a controller inserts the learned information about the switch into a client database. After populating the database, a respective controller shares the database with other controllers in the network via a reliable communication protocol (e.g., Transmission Control Protocol or TCP). Based on the local client database and the received databases, the controller identifies a subset of the switches to be managed by the controller. In some embodiments, the controller identifies the switches based on a predetermined metric. Such a metric can be the number of hops between a switch and a respective controller, and a respective controller manages only the switches closest to the controller. The metric can also be one or more of, but not limited to, link bandwidth in the network, load on the controllers, any policy configured by a user (e.g., a user-defined metric parameter), and controller identifiers. In this way, in a large network, a respective controller manages only a subset of switches in a scalable way. This subset of switches can be heterogeneous as long as a respective switch is configured with the basic switch image. Furthermore, if a controller fails, other controllers identify the switches that have been managed by the failed controller, and one or more controllers start managing the switches that have been managed by the failed switch. If a switch is the same metric (i.e., the number of hops) with respect to multiple controllers, the controller with lower load or higher adjacent-link bandwidth manages the switch. If the controllers have equal load or bandwidth, the controller with the higher (or lower) identifier value can manage the switch. In short, a respective controller can manage a heterogeneous group of switches to which a network administrator (via the controller) can apply configurations, license management, and switch replacement policies. For example, instead of obtaining individual licenses for the switches in the network, the network administrator can obtain a group license, and a controller can apply the group license to the corresponding group.

Although the present disclosure is presented using examples based on the layer-2 communication protocol, embodiments of the present invention are not limited to layer-2 networks. Embodiments of the present invention are relevant to any networking protocol which requires a loop-free network topology. In this disclosure, the term "layer-2 network" is used in a generic sense, and can refer to any networking layer, sub-layer, or a combination of networking layers below layer-3 (e.g., the network layer in the Internet protocol stack).

The term "RBridge" refers to routing bridges, which are bridges implementing the TRILL protocol as described in IETF Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "end device" can refer to a host machine, a conventional layer-2 switch, or any other type of network device. Additionally, an end device can be coupled to other switches or hosts further away from a layer-2 network. An end device can also be an aggregation point for a number of network devices to enter the layer-2 network.

The terms "interface" and "port" are used interchangeably. The term "TRILL interface" refers to an interface which sends/receives data frames encapsulated with a TRILL header and outer MAC header.

The term "switch identifier" refers to a group of bits that can be used to identify a switch. If a switch is an RBridge, the switch identifier can be referred to as an "RBridge identifier." Note that the TRILL standard uses "RBridge ID" to denote a 48-bit intermediate-system-to-intermediate-system (IS-IS) system ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense and is not limited to any bit format, and can refer to "RBridge ID," "RBridge nickname," or any other format that can identify an RBridge.

In this disclosure, the terms "switch" and "router" are used interchangeably, and refer to any device forwarding traffic in a network. The terms should not be interpreted as being limited to a layer-2 or layer-3 network. The term "node" is used in a generic sense and can refer to a switch or a router.

The term "image" refers to data stored in a nonvolatile and distributable form which represents the contents of a computing device or software controlling the computing device (e.g., an operating system). In this disclosure, any data or software that can operate a network switch or router and can be distributed across a network can be referred to as an image. The image can simply be one or more files that can contain an operating system, executable programs, and any data files that might be related to the operating system and programs.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "Ethernet fabric switch" refers to a number of interconnected physical switches which form a single, scalable logical switch. In a fabric switch, any number of switches can be connected in an arbitrary topology, and the entire group of switches can function together as one single, logical switch. This feature makes it possible to use many smaller, inexpensive switches to construct a large fabric switch, which can be viewed as a single logical switch externally.

Network Architecture

FIG. 1A illustrates an exemplary network with a controller as a single point of configuration, in accordance with an embodiment of the present invention. As illustrated in FIG. 1A, a layer-2 network 100 includes switches 122, 124, 126, 131, 132, 133, 134, 135, and 136. Also included in network 100 is a controller 112 which manages and configures the switches in network 100. Controller 112 can be a switch as well. Controller 112 has a controller image configured to manage network 100. A respective switch in network 100 has a basic switch image configured with a registration to a default all-switch multicast group. In some embodiments, at least one interface of a respective switch in network 100 has a membership in a default VLAN. As a result, a respective switch in network 100 has a membership in the VLAN and is registered to this default multicast group. In this example, switches in network 100 are coupled to each other in a tree (i.e., in a loop-free layer-2 connectivity). Any multicast message sent from controller 112 is distributed along the tree. In some embodiments, network 100 is a TRILL network and switches in network 100 are TRILL RBridges.

In some embodiments, controller 112 has a virtual media access control (MAC) address 152. Controller 112 can be accessed from outside of network 100 in layer-2 via the virtual MAC address. Controller 112 can also have a virtual Internet Protocol (IP) address 154. In some embodiments, virtual MAC address 152 is derived from virtual IP address 154. Controller 112 can be accessed from outside of network 100 in layer-3 via the virtual IP address. During operation, controller 112 uses virtual MAC address 152 as the source address for any layer-2 frame sent outside of network 100. Consequently, all switches outside of network 100 learn virtual MAC address 152 as the MAC address of controller 112. If controller 112 receives an Address Resolution Protocol (ARP) query for virtual IP address 154, controller 112 sends a response with virtual MAC address 152. As a result, a network administrator can access controller 112 via virtual MAC address 152 and virtual IP address 154. Consequently, all switches in network 100 can be managed via virtual MAC address 152 and virtual IP address 154.

During operation, controller 112 initiates the discovery process by sending a discovery message as a multicast query to the group. Controller 112 can send this multicast query for switches with membership in the default VLAN. Because all switches in network 100 are registered to the default multicast group and, optionally, have a membership in the default VLAN, a respective switch in network 100 receives this multicast message. For example, when controller 112 sends the message, switch 122 receives the message and sends a multicast response message to controller 112. The response message contains discovery information, such as an identifier of switch 122 (e.g., the MAC address of switch 122), device type (e.g., a regular switch or a controller), capability, current image (e.g., the basic image), a metric (e.g., the number of hops between switch 122 and controller 112), etc. Because it is a multicast message, switch 122 then forwards the message to switches 131 and 132. Switches 131 and 132, in turn, send respective multicast response messages containing their respective discovery information to controller 112 via switch 122. Note that when a switch responds to a multicast query message, the response is typically sent via multicast, and upon recognizing the response message, all other switches in the sub-network usually refrain from sending a response message (referred to as suppressing) to avoid flooding. However, because switches 122, 131, and 132 are interconnected in a tree structure, these switches don't suppress their responses, as described in U.S. Pat. No. 7,877,508, titled "Method and System for Intelligently Forwarding Multicast Packets," by inventor Nitin Jain, the disclosures of which are incorporated by reference herein. In some embodiments, the metric is the number of hops. Switch 122 increments the hop count value of the response messages from switches 131 and 132 to represent the number of hops these response messages have taken from switches 131 and 132 to controller 112. In the same way, switches 124, 133, 134, 126, 135, and 136 receive the multicast discovery message and send respective multicast response messages to controller 112.

Controller 112 maintains a client database 142 which contains information for a respective switch in network 100. Upon receiving the query response message from switch 122, controller 112 extracts the discovery information about switch 122 from the message and stores the information in client database 142. Controller 112 also assigns an identifier to switch 122 from a range of unique identifiers specific to controller 112. This identifier can identify switch 122 within network 100. In some embodiments, controller 112 uses the MAC address of switch 122 to create the unique identifier.

Controller 112 can periodically update client database 142 to age-out stale entries and refresh the rest of the entries. Controller 112 can periodically send the discovery message as a multicast query to network 100 to update client database 142. Switch 122 and all other switches in network 100 receive this update message and send a query response to controller 112. If a new switch joins network 100, the switch receives this periodic discovery message and sends a response. For example, when a new switch 137 joins network 100 (represented by dotted lines), switch 137 receives the periodic discovery message and sends a response to controller 112. Upon receiving the response, controller 112 assigns a unique identifier to switch 137. In this way, controller 112 quickly discovers new switch 137 joining network 100 after the initial discovery process. In some embodiments, controller 112 can be coupled to a local Trivial File Transfer Protocol (TFTP) server 160. Controller 112 can store switch-specific files, such as a switch image or a license file for a switch in TFTP server 160. In this way, controller 112 does not need to store such files in local memory. Instead of obtaining individual licenses for the switches in network 100, a network administrator can obtain a group license, and controller 112 can apply the group license to the corresponding group.

Figure 1B:
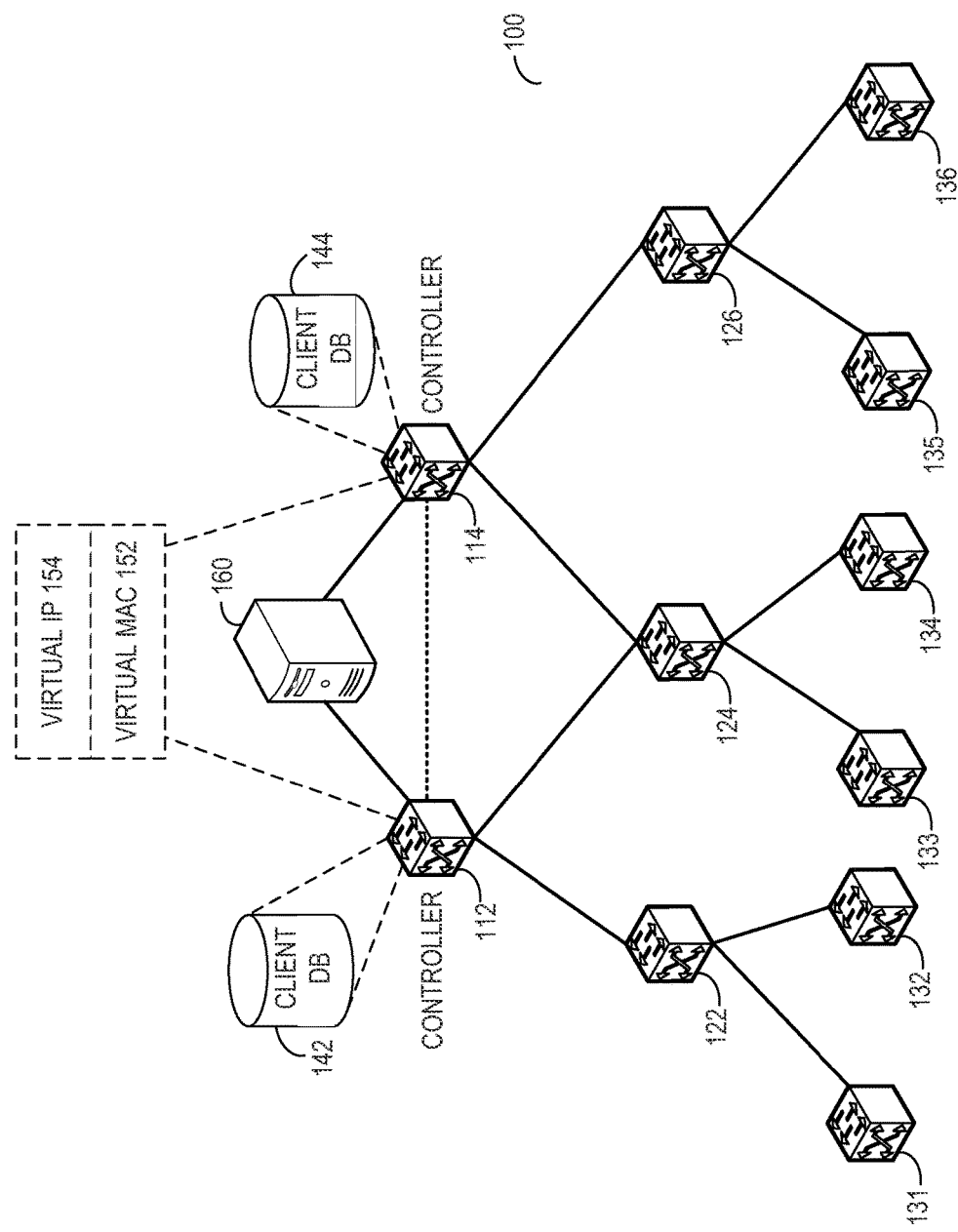
FIG. 1B illustrates an exemplary network with multiple controllers, in accordance with an embodiment of the present invention.

In some embodiments, network 100 can have multiple controllers. A respective controller manages a subset of the switches in network 100. FIG. 1B illustrates an exemplary network with multiple controllers, in accordance with an embodiment of the present invention. The components in FIG. 1B are the same as in FIG. 1A, so the same numerals have been used. In this example, network 100 has another controller 114 which includes client database 144. The switches in network 100 receive discovery messages as multicast queries from controllers 112 and 114, and send query responses to both controllers with switch-specific information. In this way, both controllers 112 and 114 discover the switches and presence of another controller based on the device type information, as described in conjunction with FIG. 1A. Note that controllers 112 and 114 both can store switch-specific files in TFTP server 160. In this way, both controllers 112 and 114 can use a single TFTP server 160 for storing and accessing the switch-specific files.

When a network has multiple controllers, such as network 100, a particular controller can be associated with (or owns) the virtual MAC address and the virtual IP address. In this example, controller 112 owns virtual MAC address 152 and virtual IP address 154. During operation, both controllers 112 and 114 use virtual MAC address 152 as the source address for any layer-2 frame sent outside of network 100. Consequently, all switches and end devices outside of network 100 view controllers 112 and 114 as one single switch and learn virtual MAC address 152 as the MAC address of the single device. Controller 112 can respond to ARP queries for virtual IP address 154 with virtual MAC address 152. As a result, a network administrator can access a respective controller from outside of network 100 via a single virtual IP address 154 and its corresponding virtual MAC address 152. For example, the network administrator can access controller 112 via virtual IP address 154. Because controller 112 contains information about all other switches in network 100 in client database 142, once the network administrator accesses controller 112, the administrator can manage all switches in network 100. In this way, all controllers in network 100 can be accessed using a single virtual MAC address 152 and a single virtual IP address 154. This provides further ease to a network administrator managing network 100.

After the initial discovery, controller 112 shares client database 142 with controller 114. For controller 112, client database 142 is a local client database and client database 144 is a remotely learned client database (can be referred to as a remote client database). Controller 112 uses a reliable data exchange protocol (e.g., TCP) to distribute the local client database to other controllers. Similarly, controller 114 shares client database 144 with controller 112 via the reliable protocol. Upon receiving the remote client database, a respective controller decides which subset of switches in network 100 the controller is going to manage. In FIG. 1B, controller 112 manages a subset of the switches in network 100, while controller 114 manages the rest. A respective controller selects the subset of switches the controller manages based on a metric, which can include, but not limited to, number of hops between a switch and a controller, link bandwidth in the network, load on the controllers, and any policy configured by a user (e.g., a user-defined metric parameter), etc. The controller with the best metric for a respective switch manages that switch. A respective controller in network 100 derives the metric from the local and remote client databases. Controllers 112 and 114 periodically update client databases 142 and 144, respectively, and share these databases among themselves. As a result, if controller 112 fails, controller 114 manages the switches that have been managed by controller 112 based on the information from client database 142. Furthermore, controller 114 becomes the owner of virtual MAC address 152 and virtual IP address 154, allowing a network administrator to still use the same MAC and IP addresses to manage network 100.

In some embodiments, network 100 can be a layer-3 network, wherein a respective switch is a layer-3 networking device, such as a router. Under such a scenario, controller 112 presents virtual IP address 154 for management of network 100. Controller 112 discovers a respective router based on local information and/or discovery protocols. Such local information and discovery protocols can include, but are not limited to, Simple Network Management Protocol (SNMP) query, subnet probing, Address Resolution Protocol (ARP) table, routing table, Foundry Discovery Protocol (FDP), Cisco Discovery Protocol (CDP), etc. The network administrator of network 100 configures the default multicast group and IP address of controller 112 in a respective router in network 100. Controller 112 can issue remote commands to configure a multicast group. In some embodiments, controller 112 uses Source-Specific Multicast (SSM) protocol for distributing information to the multicast group. In some further embodiments, network 100 can be a layer-2 and layer-3 hybrid network, wherein a respective switch can be a layer-2 switch or a layer-3 router. For example, in FIG. 1B, if switch 122 is also a router, then switches 131 and 132 use IGMP protocol to communicate to router 122. Router 122 keeps track of the multicast group membership information and forwards any messages from controller 112 to switches 131 and 132.

In some embodiments, the communication between the controllers and switches (e.g., between controller 112 and switch 132 in network 100) can be secured using encryption. A respective controller securely exchanges a group key with the cluster of switches the controller manages. In some embodiments, the controller uses public key cryptography to securely exchange the group key. Whenever the controller detects a change in the cluster (e.g., a new switch joins the cluster or a switch leaves the cluster), the controller generates another group key and shares with the updated cluster. For example, if controller 112 manages a cluster with switches 122, 131, and 132, controller 112 shares a group key with these switches. If switch 132 leaves the cluster, controller 112 generates another key and shares the key with switches 122 and 131. Controller 112 encrypts the communication within the cluster using the group key. A respective switch (e.g., switch 122) in the cluster decrypt the communication using the group key.

Clustering

Figure 2A:
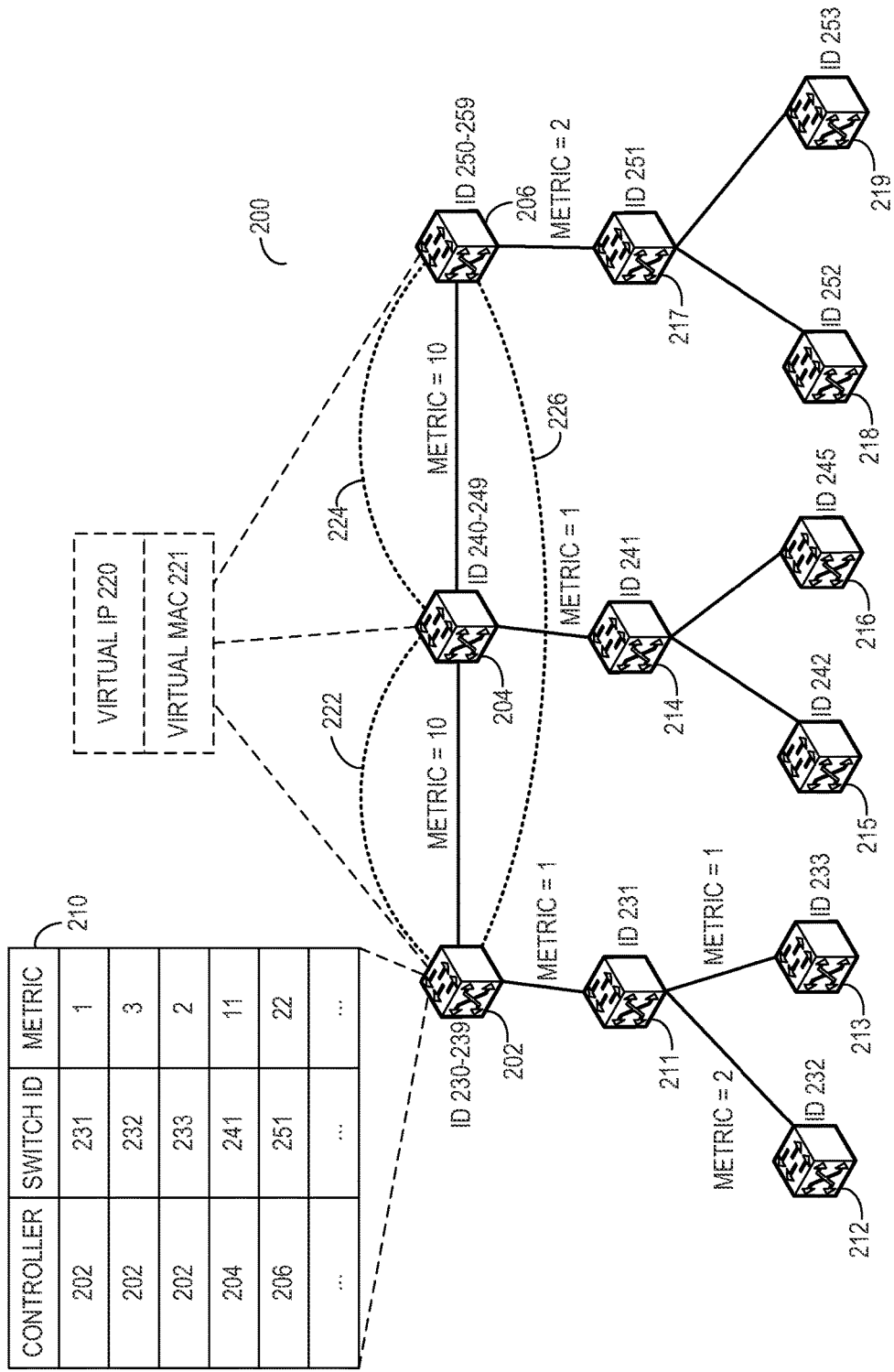
FIG. 2A illustrates a controller using a metric for cluster formation, in accordance with an embodiment of the present invention.

Multiple controllers in a network can divide the responsibility of managing a large number of switches among themselves and provide a scalable way of managing the network. In other words, a controller creates a cluster of switches which the controller manages. A respective controller selects the switches in the cluster based on a metric. In some embodiments, such metric can be the number of hops between a switch and a respective controller, link bandwidth in the network, load on the controllers, and any policy configured by a user, etc. The controller with the best metric for the switch manages the switch. FIG. 2A illustrates a controller using a metric for cluster formation, in accordance with an embodiment of the present invention. Network 200 includes controllers 202, 204, and 206. Also included in network 200 are switches 211-219. A respective controller assign can an identifier to a switch from a range of unique identifiers allocated for the controller. The range of unique identifiers for controllers 202, 204, and 206 are 230-239, 240-249, and 250-259, respectively. Virtual IP address 220 and virtual MAC address 221 are associated with controllers 202, 204, and 206, as described in conjunction with FIG. 1B.

A respective link in network 200 is associated with a metric. For example, the metric value for the links between controllers 202 and 204, and controller 202 and switch 211 are 10 and 1, respectively. During operation, controller 202 sends a discovery message to the default multicast group in network 200, as described in conjunction with FIG. 1B. Upon receiving the discovery message, a respective switch sends a multicast response message containing a metric value. At each hop, the metric value is updated at the intermediate switch. For example, switch 213 sends a response to the discovery message from controller 202 with a metric value of 1 (corresponding to the link between switches 211 and 213). Upon receiving the response, intermediate switch 211 updates the metric value to 2 by adding the metric value corresponding to the link between switch 211 and controller 202. Controller 202 receives the response and associates switch 213 with a metric value of 2. In the same way, controller 202 receives responses from all other switches in network 200. At the same time, controller 202 receives responses to the discovery message of controllers 204 and 206 via multicast as well.

Based on the received information, controller 202 constructs client database 210 and exchanges that information with controllers 204 and 206 via reliable communications 222 and 226, respectively. Similarly, controllers 204 and 206 exchange their respective client databases with the other controllers in network 200 via reliable communications 222, 224, and 226. In some embodiments, the reliable communications 222, 224, and 226 are TCP connections. Upon receiving the client databases (can be referred to as remote client databases) from controllers 204 and 206, controller 202 identifies that switches 211, 212, and 213 have the best metric with respect to controller 202. Controller 202 then starts managing these switches, and assigns identifiers 231, 232, and 233 to switches 211, 212, and 213, respectively, from the range of unique identifiers associated with controller 202. Similarly, controller 204 starts managing switches 214, 215, and 216, and assigns identifiers 241, 242, and 245 to these switches, respectively, and controller 206 starts managing switches 217, 218, and 219, and assigns identifiers 251, 252, and 253 to these switches, respectively.

In some embodiments, network 200 is a layer-2 network, wherein controllers 202, 204, and 206 are part of the same VLAN/subnet. During operation, controllers 202, 204, and 206 elect one of the controllers to own virtual IP address 220. In some embodiments, the election process comprises of exchanging election messages. A respective election message contains a priority field which determines the controller that owns virtual IP address 220. For example, the controller with the highest (or lowest) priority value can own virtual IP address 220. If there is a tie in the priority value, in some embodiments, a tie breaker is used to determine the ownership. Such tie breaker can include, but not limited to, the number of interfaces in a controller, proximity to switches, current load, and a controller identifier.

Suppose that, controllers in network 200 elect controller 202 as the owner of virtual IP address 220. Any end device from outside of network 200 can access controller 202 via virtual IP address 220. A virtual MAC address 221 is derived from virtual IP address 220. Controller 202 sends a periodic message to controllers 204 and 206. If failure occurs to controller 202, controllers 204 and 206 do not receive this message for a period of time and, consequently, reelect another controller (e.g., controller 204) as the owner of virtual IP address 220. Any end device from outside of network 200 can then access controller 204 via the same virtual IP address 220.

FIG. 2B illustrates a controller using the hop count as a metric for cluster formation, in accordance with an embodiment of the present invention. The components in FIG. 2B are the same as in FIG. 2A, so the same numerals have been used. During operation, controllers 202 and 204 discover the switches in network 200, as described in conjunction with FIG. 2A. Controller 202 learns from the discovery process that switches 211, 212, and 216 are 1, 2, and 3 hops away, respectively, and stores the information in a local client database. Similarly, controller 204 learns that switches 211, 212, and 216 are 2, 3, and 1 hops away, respectively, and stores the information in a local client database. After the discovery, controllers 202 and 204 exchange their local client databases via a reliable protocol. Controller 202 learns from the received client database that switch 211 is 2 hops away from controller 204. Because controller 202 is only 1 hop away from switch 211, controller 202 starts managing switch 211. Controller 202 also learns that switch 216 is 3 and 2 hops away from controllers 202 and 204, respectively. Hence, controller 202 does not manage switch 216 because controller 204 is closer to switch 216.

If a switch is equal number of hops away from controllers 202 and 204, a tie breaker, such as number of interfaces or controller identifier can be used to break the tie. For example, controller 204 can have higher number of interfaces or a preferable interface identifier. In some embodiments, if controller 204 manages a large number of switches and reaches a threshold value of the number of switches a controller can manage, controller 202 can manage the rest of the equidistant switches.

Figure 2C:
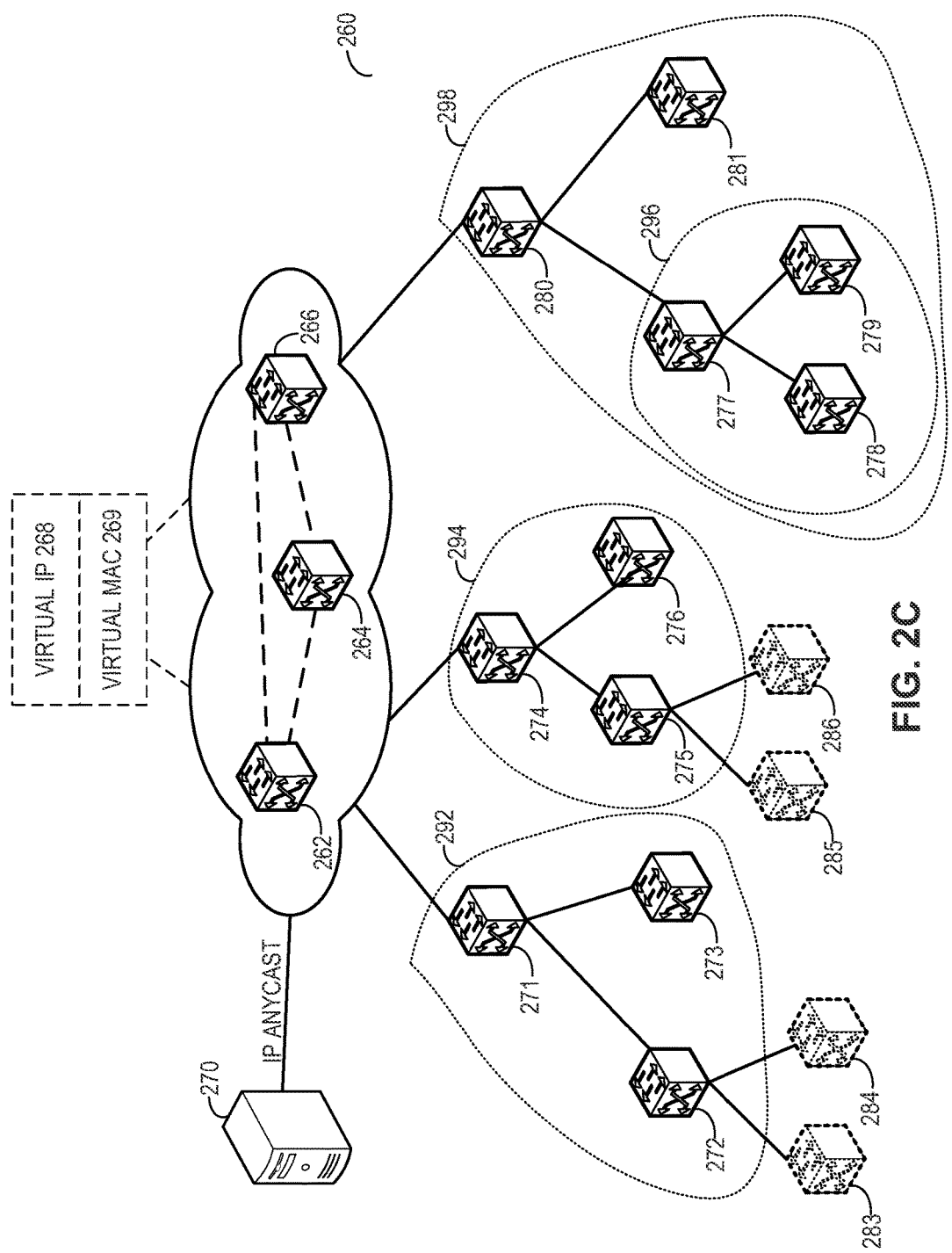
FIG. 2C illustrates cluster formation in layer-3, in accordance with an embodiment of the present invention.

In some embodiments, switches and controllers in a network can be interconnected via layer-3. FIG. 2C illustrates cluster formation in layer-3, in accordance with an embodiment of the present invention. Network 260 includes controllers 262, 264, and 266. Also included in network 260 are layer-3 routers 271-281. In some embodiments, controllers 262, 264, and 266 are layer-3 routers as well. A respective router in network 260 can be uniquely identified using a corresponding router identifier. Virtual IP address 268 is associated with controllers 262, 264, and 266, as described in conjunction with FIG. 1B. In network 260, controllers 262, 264, and 266 are in different subnets. Virtual IP address 268 can be considered as an anycast IP address. If end device 270 uses virtual IP address 268 to accesses a controller, the end device reaches one of the controllers with the best metric with respect to end device 270.

Controller 262, 264, and 266 exchanges information among each other using a reliable protocol (e.g., TCP). A respective controller sends a periodic message informing the other controllers its active status, as described in conjunction with FIG. 2A. During operations, controllers 262, 264, and 266 discover the routers in network 260 one or more methods, that include, but not limited to, recursively probing routers in network 260, accessing the routing tables to obtain next-hop information using SNMP, ARP tables, and interface addresses. Once the routers are discovered, controller 262, 264, and 266 assign a metric to a respective hop to a respective router. In some embodiments, controllers 262, 264, and 266 use traceroute for assigning the metric.

After the discovery, controller 262 constructs a respective client database of the routers of network 260. The client database can contain information associated with a respective router, such as an IP address, a router identifier, and a metric with respective to the controller. Controller 262 shares the client database with controllers 264 and 266. Similarly, controllers 264 and 266 construct their local client databases and share with other controllers. Based on the metric derived from the local and remote client databases, a respective controller determines the routers the controller manages based on the metric, as described in conjunction with FIG. 2A. For example, controller 262 can manage router group 292, controller 264 can manage router group 294, and controller 266 can manage router groups 296 and 298, based on the metric. A respective controller then manages the routers in the corresponding router group by assigning remote commands to the group.

Controller 262 can assign multicast group membership to the routers in group 292 based on the policy configured in controller 262. Similarly, controller 264 can assign multicast group membership to routers in group 294, and controller 266 assigns multicast group membership to routers in groups 296 and 298. In this example, routers 277-279 can have a plurality of multicast group membership. Once the multicast groups are assigned, a respective controller forms the corresponding multicast distribution tree with the controller as the root of the tree. In some embodiments, the controller uses Protocol-Independent Multicast (PIM) to construct the tree. The controller uses the corresponding multicast group to apply configuration commands, firmware, etc to the routers in the group.

In some embodiments, some of the switches in network 260 can be layer-2 switches. Consequently, network 260 can have a combination of layer-2 switches and layer-3 routers. For example, in network 260, layer-2 switches 283 and 284 (denoted with dotted lines) are coupled to router 272, and layer-2 switches 285 and 286 are coupled to router 275. Router 272 sends discovery message using layer-2 multicast to switches 283 and 284, and collects information about these switches. Similarly, router 275 sends discovery message to switches 283 and 284, and collects information about these switches. In this way, a respective router collects information about switches in the corresponding subnet. Routers 272 and 275 then send the collected information to the controllers. In some embodiments, routers 272 and 275 sends the collected information using multicast join messages for the default multicast group in network 260, wherein the collected information can be a part of the payload of the multicast join messages.

Cluster Formation and Maintenance

Figure 3A:
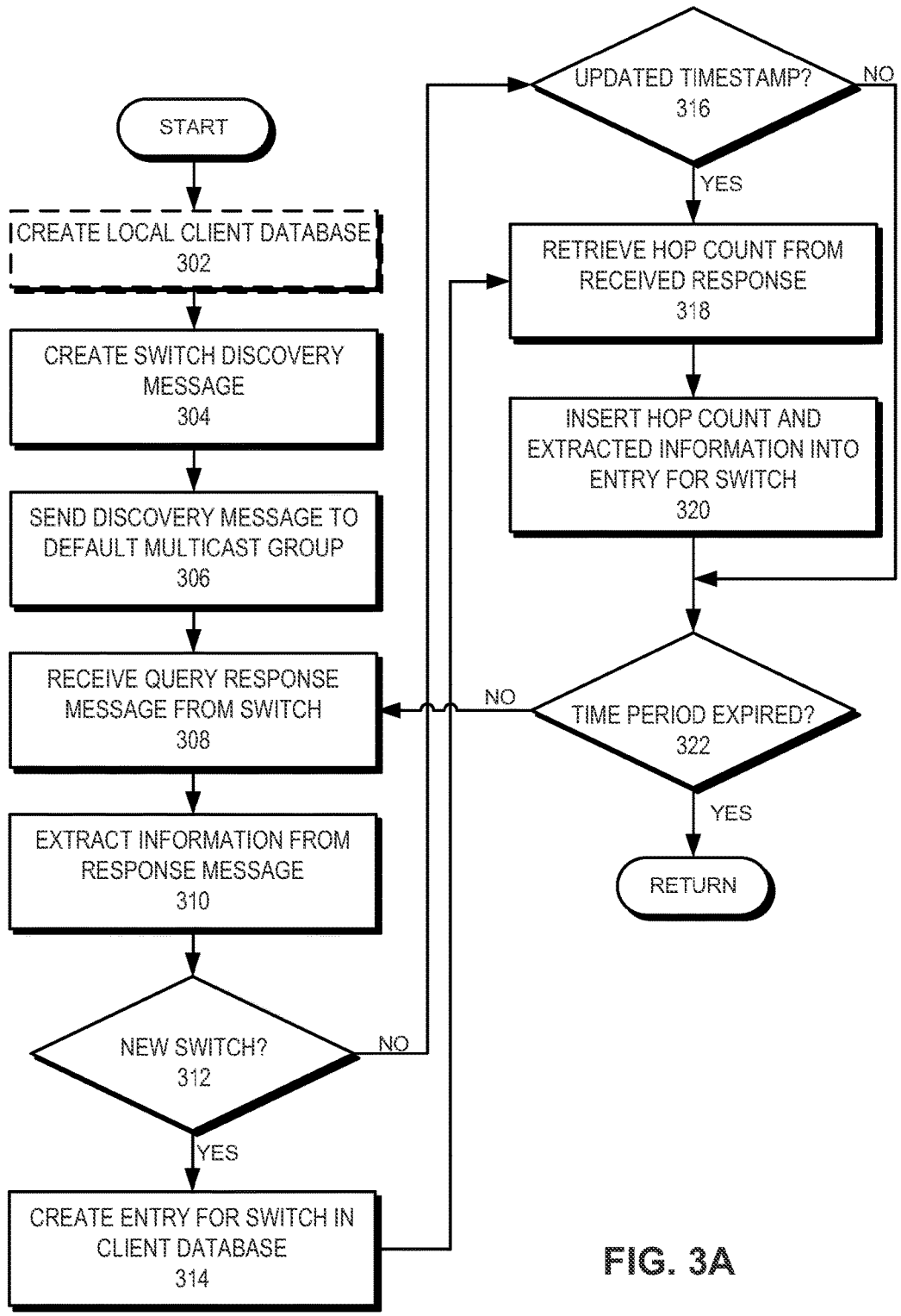
FIG. 3A presents a flowchart illustrating the process of a controller discovering a network topology, in accordance with an embodiment of the present invention.

To form a cluster, a controller first discovers the switches in a network, exchanges the discovery information with other controllers in the network, and selects the switches closest to the controller for management. FIG. 3A presents a flowchart illustrating the process of a controller discovering a network topology, in accordance with an embodiment of the present invention. The controller executes the discovery process periodically. Only for the initial execution, the controller creates a client database (operation 302) for storing switch-specific discovery information. For subsequent executions, the controller does not execute operation 302. The controller then creates a switch discovery message (operation 304) as a multicast query message and sends the message to the default multicast group of the network to which the controller belongs (operation 306). The controller optionally can make this message specific to the members of a default VLAN. In some embodiments, the discovery message is distributed as a layer-2 multicast message. The controller receives the query response message from a respective switch in the network (operation 308) and extracts the discovery information from the response message (operation 310). This query message and the corresponding query response message can be multicast messages (e.g., IGMP messages).

Next, the controller checks whether the switch is a new switch (operation 312). If so, the controller creates an entry in the client database for the new switch (operation 314). If the switch is not a new switch, then the controller checks whether the timestamp (i.e., age) of the switch has been updated (operation 316). The controller can check this by comparing the extracted information about the switch with the information in the entry in the client database associated with the switch. If the extracted information is updated or an entry for the switch has been created, the controller retrieves hop count information from the received response message (operation 318) and inserts the hop count and extracted information into the entry for the switch (operation 320). The controller then checks whether the time period for the controller to receive responses from the switches has expired (operation 322). The controller receives responses from the switches within a predefined period of time. If that time period has not expired, the controller can continue to receive query responses from switches (operation 308).

Figure 3B:
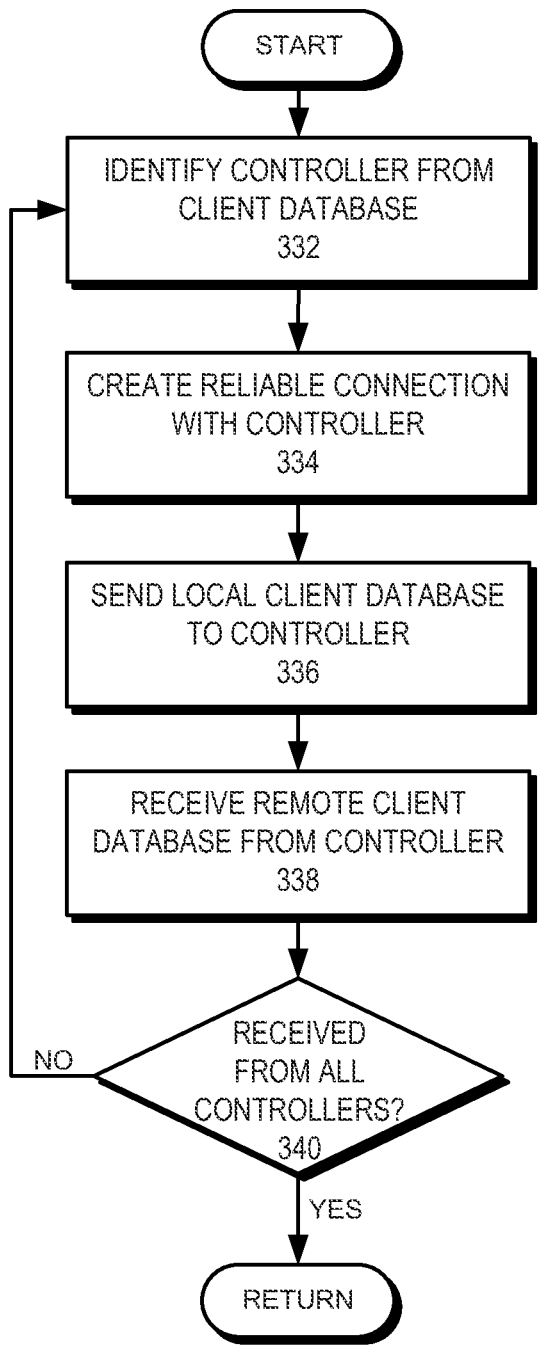
FIG. 3B presents a flowchart illustrating the process of a controller sharing information with another controller, in accordance with an embodiment of the present invention.

After the discovery, a controller shares the local client database with all other controllers in the network. FIG. 3B presents a flowchart illustrating the process of a controller sharing information with another controller, in accordance with an embodiment of the present invention. The controller identifies another controller in the client database (operation 332), as described in conjunction with FIG. 1B. The controller then establishes a reliable connection with the other controller (operation 334) and sends the local client database to the other controller (operation 336). The controller receives the remote client database from the other controller (operation 338). Note that the controller can execute operations 336 and 338 in parallel or in a different order. The controller then checks whether it has received remote client databases from all other controllers (operation 340). If not, the controller can continue to identify other controllers from which it has not received a remote client database (operation 332).

Figure 3C:
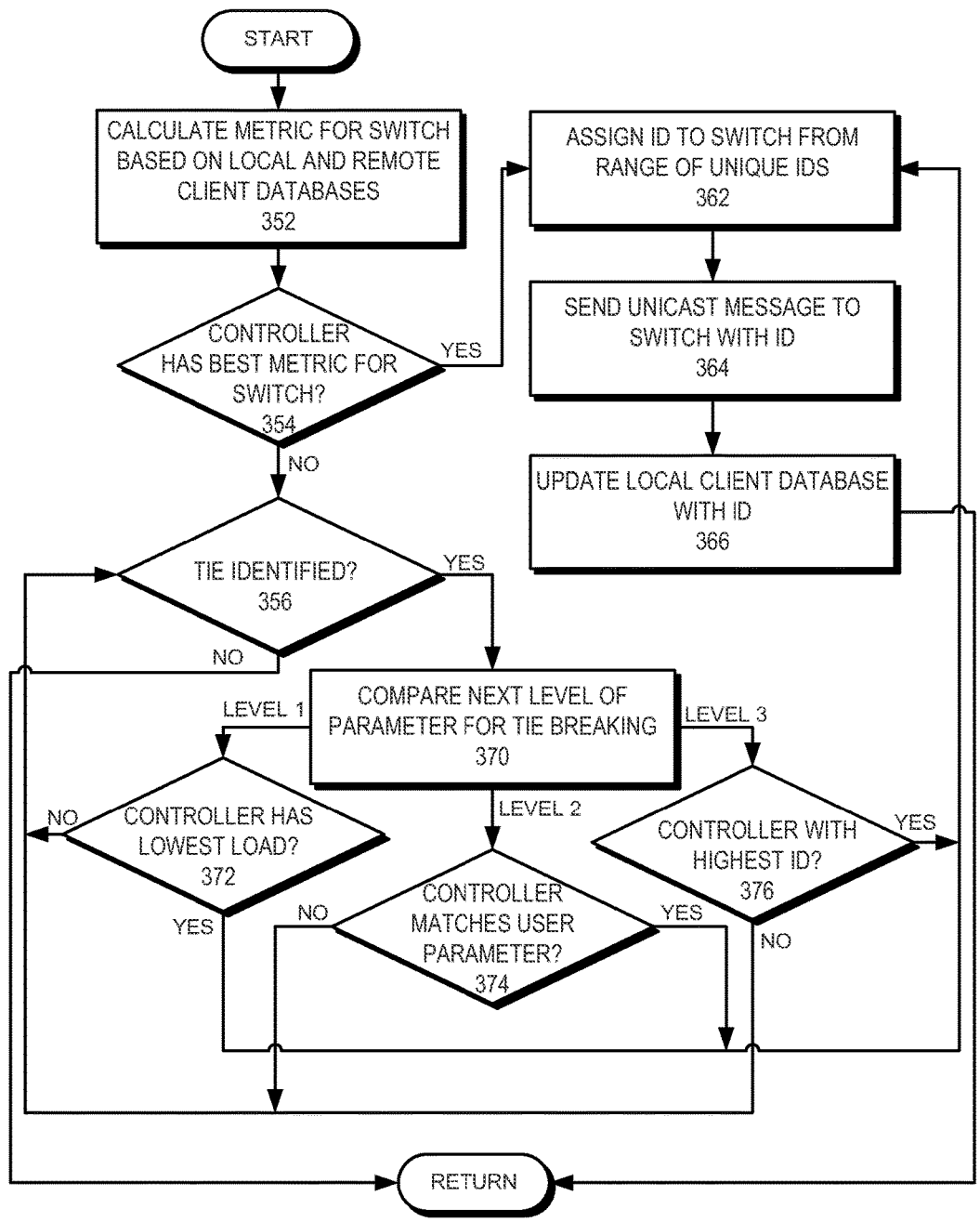
FIG. 3C presents a flowchart illustrating the process of a controller selecting a switch for its cluster, in accordance with an embodiment of the present invention.

Once the controller receives remote client databases from all other controllers, the controller selects the switches for its cluster (i.e., the switches that the controller manages). FIG. 3C presents a flowchart illustrating the process of a controller selecting a switch for its cluster, in accordance with an embodiment of the present invention. The controller first calculates the metric for the switch based on local and remote client databases (operation 352), as described in conjunction with FIG. 2A. The controller then checks whether the switch has the best metric with respect to the controller (operation 354). If so, the controller assigns a unique identifier to the switch from a range of unique identifiers (operation 362). This range of identifiers can be specific to the controller and another controller can recognize a switch being managed by the controller from the identifier. In some embodiments, this identifier can be an IP address. This IP address can be internal to the network and typically used for the controller to send data to the switch. The controller can use the MAC address of the switch to create the unique identifier. For example, the MAC address can be a part of the identifier. The controller then sends a unicast message containing the unique identifier to the switch (operation 364) and updates the local client database with the identifier (operation 366).

If the switch does not have the best metric with respect to the controller (operation 354), the controller checks whether there is a tie (operation 356) (i.e., whether the switch has the same metric with respect to one or more other controllers). If so, then the controller compares different levels of tie-breaking parameters (operation 370). In some embodiments, load on a controller, user-defined parameter, and controller identifier can be level 1, 2, and 3 of tie-breaking parameters. The controller first compares level 1 tie-breaking parameter and checks whether the controller has the lowest load compared to the other controllers (operation 372). If not and if there is still a tie (operation 356), the controller compares the level 2 tie-breaking parameter (operation 370). The controller then checks whether the controller has the best user-defined parameter compared to the other controllers (operation 374). In some embodiments, such a parameter can be residual capacity in the links coupled to the controller. If not and if there is still a tie (operation 356), the controller compares the level 3 tie-breaking parameter (operation 370). The controller checks whether the controller has an identifier with a higher value compared to the other controllers (operation 376). If the controller has the best tie-breaking parameter at any level, the controller manages the switch and assigns an identifier to the switch from its range of unique identifiers (operation 362). The controller then sends a unicast message containing the identifier to the switch (operation 364) and updates the local client database with the unique identifier (operation 366).

Figure 4:
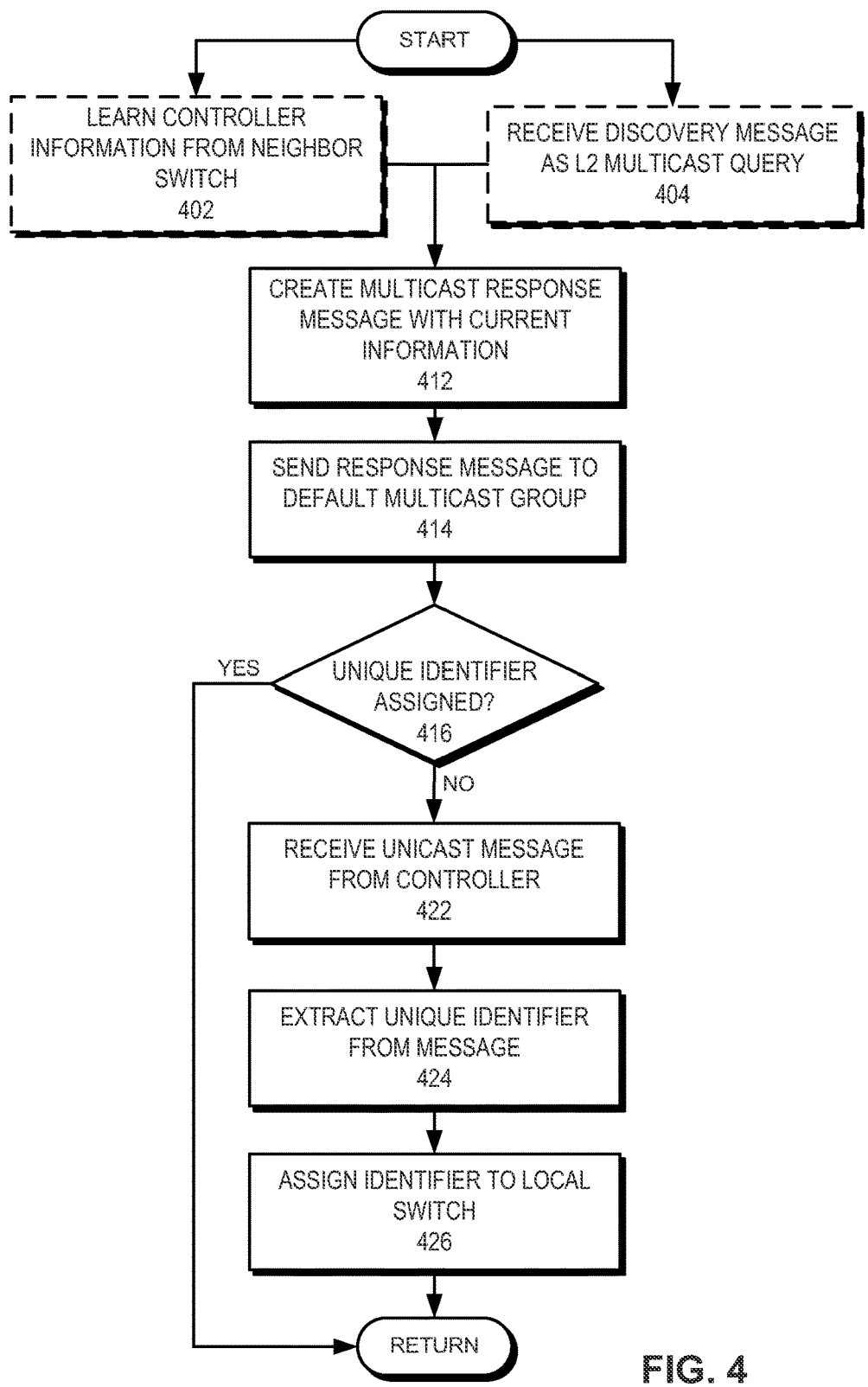
FIG. 4 presents a flowchart illustrating the process of a switch being clustered, in accordance with an embodiment of the present invention.

FIG. 4 presents a flowchart illustrating the process of a switch being clustered, in accordance with an embodiment of the present invention. The switch can either learn controller information from a neighbor switch (operation 402) or by receiving a discovery message as a layer-2 multicast query from a controller (operation 404). After learning about the controller, the switch creates a multicast response message with current discovery information (operation 412). The switch sends this response message to the default multicast group (operation 414).

The switch then checks whether a unique identifier has been assigned to the switch (operation 416). If so, then the discovery message is a periodic message and the switch has already been discovered. Otherwise, the switch receives a unicast message from the controller containing the unique identifier (operation 422). The switch extracts the unique identifier from the message (operation 424) and assigns the identifier to the switch (operation 426). In some embodiments, this identifier can be an IP address. This IP address can be internal to the network and typically used for the controller to send data to the switch. Note that, once the IP addresses are assigned, existing management tools such as Telnet and/or Secure Shell (SSH) can be used to manage a respective switch using unicast.

Failure Recovery

Figure 5:
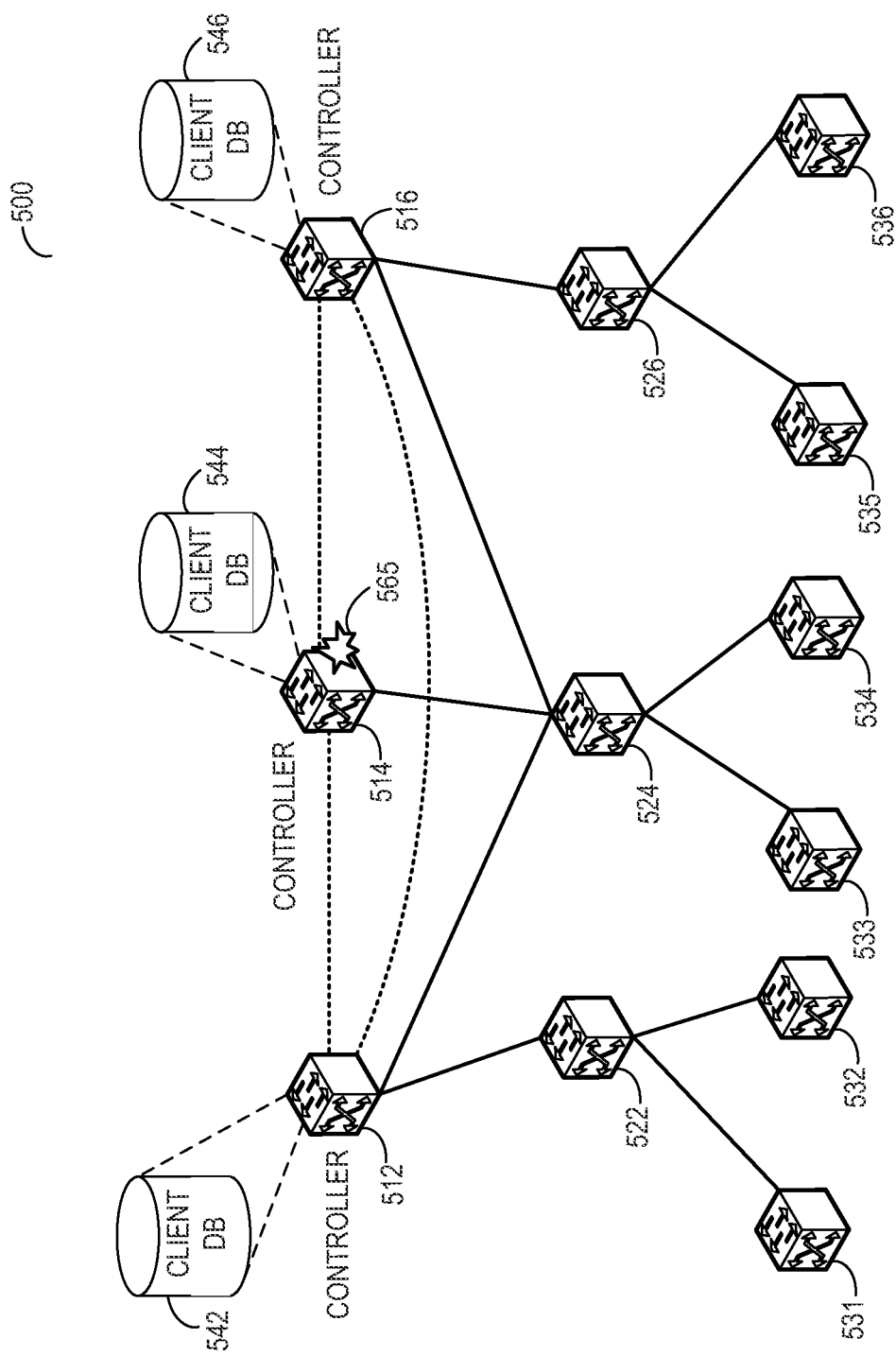
FIG. 5 illustrates a failure of a controller in an exemplary network, in accordance with an embodiment of the present invention.

Managing a network through clustering enables a controller to share the responsibility of managing switches that have been managed by a failed controller. FIG. 5 illustrates a failure of a controller in an exemplary network, in accordance with an embodiment of the present invention. A network 500 includes controllers 512, 514, and 516 which can be switches. Also included in network 500 are switches 522, 524, 526, 531, 532, 533, 534, 535, and 536. Controllers 512, 514, and 516 include client databases 542, 544, and 546, respectively. During operation, controllers 512, 514, and 516 establish reliable connections and share client databases 542, 544, and 546 among each other (denoted with dotted lines). A respective controller calculates the hop count with a respective switch. In this example, controller 512 manages switches 522, 531, and 532; controller 514 manages switches 524, 533, and 534; and controller 516 manages switches 526, 535, and 536. A respective controller assigns a unique identifier to the switches it manages from a range of identifiers specific to the controller. For example, identifiers assigned to switches 524, 533, and 534 are specific to controller 514; controllers 512 and 516 can recognize switches 524, 533, and 534 as being managed by controller 514 from their identifiers.

Suppose that controller 514 incurs failure 565. As a result, controller 514 cannot manage switches 524, 533, and 534 any longer. Controllers 512 and 516 detect failure 565 and identify switches 524, 533, and 534 based on the assigned identifiers. Controllers 512 and 516 then check which of switches 524, 533, and 534 is closest to them based on client databases 542 and 546, and start managing these switches. Controllers 512 and 516 discover that switches 524, 533, and 534 are an equal number of hops away from both controllers. Under such a scenario, controllers 512 and 516 check the identifiers of controllers 512 and 516, and compare the identifier values. In some embodiments, the controller with a higher (or lower) identifier value manages these switches. For example, if controller 512 has a higher identifier value than controller 516, controller 512 can manage switches 524, 533, and 534. In some embodiments, if controller 512 manages a large number of switches and reaches a threshold value of the number of switches a controller can manage, controller 516 can manage the rest of the equidistant switches, as described in conjunction with FIG. 2.

Figure 6:
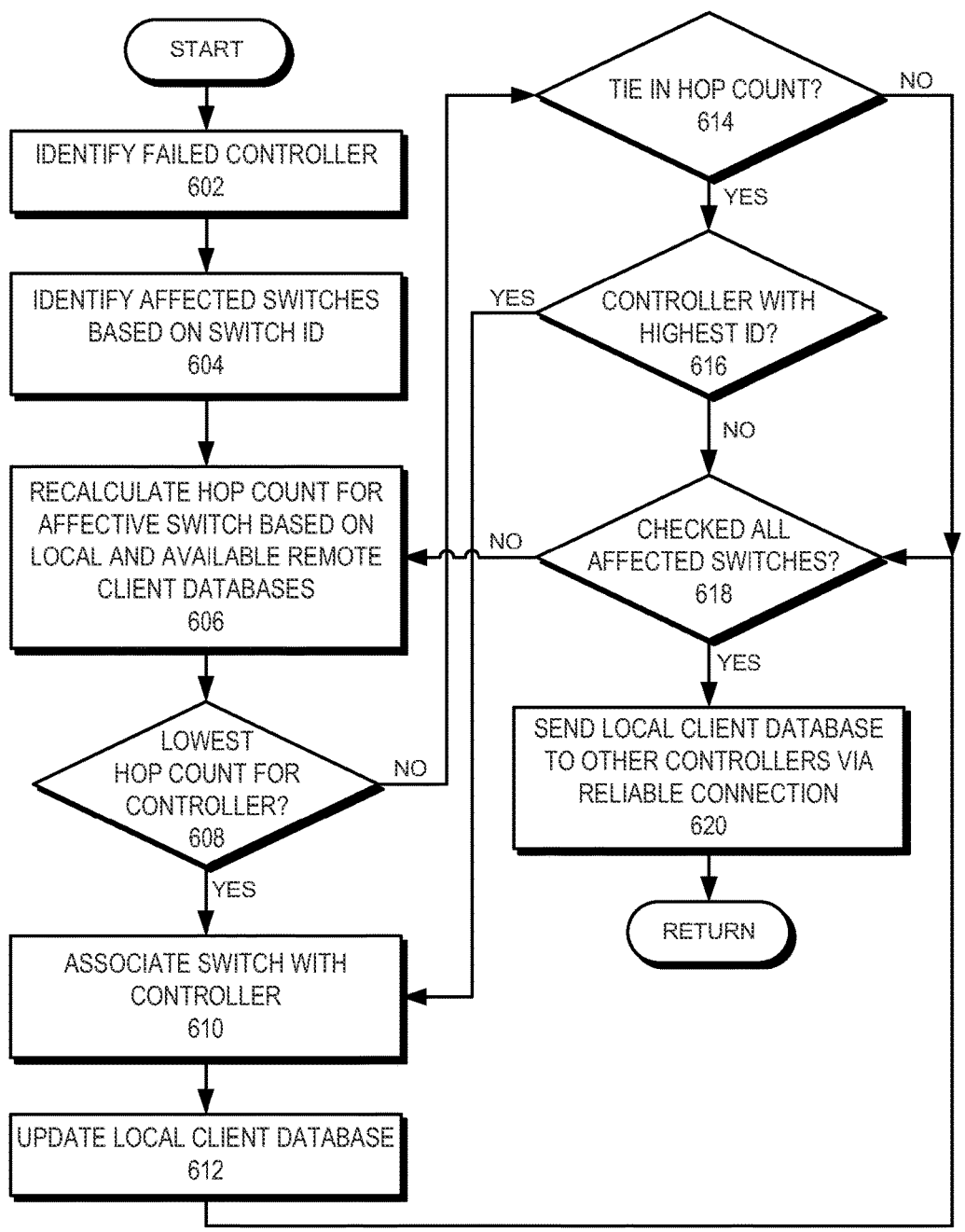
FIG. 6 presents a flowchart illustrating the process of a controller responding to a controller failure, in accordance with an embodiment of the present invention.

FIG. 6 presents a flowchart illustrating the process of a controller responding to a controller failure, in accordance with an embodiment of the present invention. Upon identifying a failed controller (operation 602), the controller identifies the affected switches that have been managed by the failed controller based on the switch identifiers (operation 604), as described in conjunction with FIG. 5. The controller then recalculates the hop count for a respective affected switch based on local and other available remote client databases (operation 606). For the example in FIG. 5, controller 512 recalculates the hop count for switches 524, 533, and 534 based on client databases 542 and 546. The controller then checks whether the switch has the lowest hop count for the controller (operation 608). If so, the controller associates the switch with the controller (operation 610). In some embodiments, the controller associates with the switch by assigning another identifier to the switch from a range of switch identifiers specific to the controller and sending a unicast message to the switch with the new identifier. The controller then updates the local client database with the association (operation 612).

If the switch does not have the lowest hop count for the controller (operation 608), the controller checks whether there is a tie in the hop count (operation 614). If so, then the controller checks whether the controller has an identifier with a higher value compared to the other active controllers (operation 616). If the controller has the highest identifier value, the controller manages the switch and associates the switch with the controller (operation 610). If there is not a tie in the hop count (operation 614), if the controller does not have an identifier with a higher value compared to the other active controllers (operation 616), or when the controller updates the local client database with the unique identifier of a switch (operation 612), the controller checks whether the controller has checked all the affected switches associated with the failed switch (operation 618). If not, the controller recalculates the hop count for another switch (operation 606). If the controller has checked all the affected switches, the controller sends the local client database to other controllers via reliable connection (operation 620), as described in conjunction with FIG. 3B.

Exemplary Switch System

Figure 7:
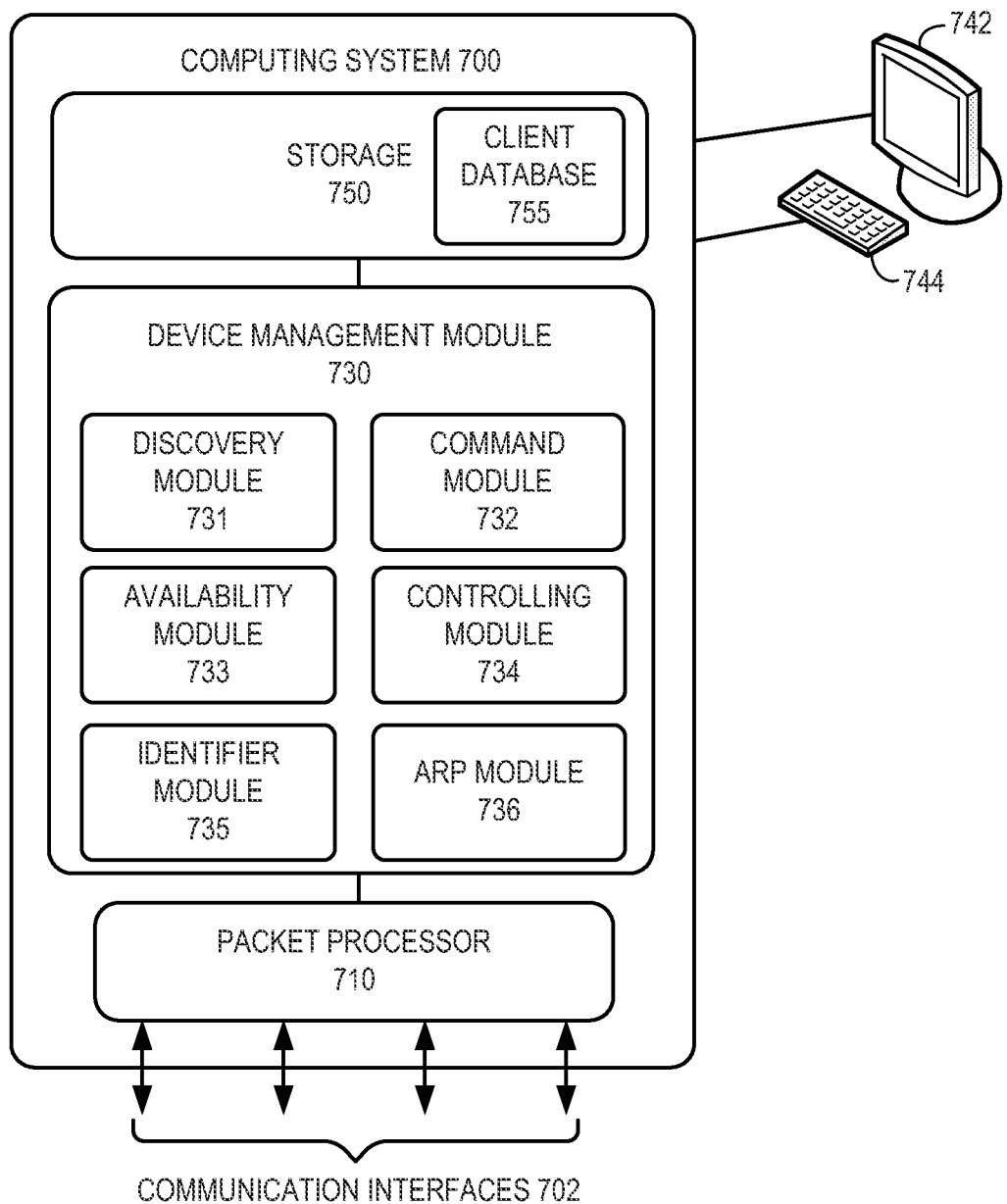
FIG. 7 illustrates an exemplary computing device, in accordance with an embodiment of the present invention.

FIG. 7 illustrates an exemplary computing system, in accordance with an embodiment of the present invention. In this example, a computing system 700 includes a number of communication interfaces 702, a device management module 730, a packet processor 710, and a storage 750. Packet processor 710 extracts and processes header information from the received frames. Computing system 700 is registered to a multicast group. The switch can optionally be coupled to a display device 742 and an input device 744.

During operation, discovery module 731 periodically sends discovery messages in conjunction with packet processor 710 via communication interfaces 702 to the default multicast group.

Upon receiving a response to a discovery message from a remote switch via one of the communication interfaces 702, packet processor 710 sends the payload of the message to device management module 730. Device management module 730 extracts the content of the response and stores the information in a client database 755 in storage 750. After populating client database 755, availability module 733 shares the client database with other computing systems in the network in conjunction with packet processor 710. Computing system 700 also receives client databases from the other computing systems via the communication interfaces 702. Controlling module 734 then determines whether computing system 700 should manage the remote switch based on the number of hops between the remote switch and computing system 700. If the remote switch has the fewest number of hops to computing system 700 compared to the other computing systems in the network, identifier module 735 assigns a unique identifier to the remote switch and sends the identifier to the remote switch in conjunction with packet processor 710.

Packet processor 710 identifies a virtual IP address and a virtual MAC address in the header of any received control message via one of the communication interfaces 702. Such control message can be sent by a network administrator. Packet processor 710 also identifies any ARP query for the virtual IP address. If computing system 700 is configured to respond to the ARP query, ARP module 736 sends a response back with the virtual MAC address.

Note that the above-mentioned modules can be implemented in hardware as well as in software. In one embodiment, these modules can be embodied in computer-executable instructions stored in a memory which is coupled to one or more processors in computing system 700. When executed, these instructions cause the processor(s) to perform the aforementioned functions.

In summary, embodiments of the present invention provide a switch, a method and a computing system for managing a plurality of interconnected switches with high availability and scalability. The computing system includes a discovery module, an availability management module, and a controlling module. The discovery module determines local switch-specific information associated with a switch based on a discovery response packet. The availability management module determines remote switch-specific information about the same switch with respect to a remote computing system. The controlling module determines whether the computing system is to manage the switch based on a metric derived from the local and remote switch-specific information.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A first computing system, comprising:
   a processor; and
   a non-transitory computer-readable storage medium storing instructions which when executed by the processor causes the processor to perform a method, the method comprising:
   determining discovery information of a first switch from a discovery response packet, wherein the discovery response packet is a multicast packet destined to a multicast group which includes the first switch and the first computing system, and wherein a multicast group is associated with a multicast distribution tree via which a multicast packet destined for the multicast group is distributed;
   storing the discovery information of the first switch in a first entry of a first client database in the first computing system;
   obtaining discovery information of the first switch from a notification message comprising a second entry of a second client database of a second computing system; and
   determining whether the first computing system is to manage the first switch based on the discovery information of the first switch from the first and second entries, wherein managing a switch includes configuring the switch.

2. The first computing system of claim 1, wherein the discovery information of the first switch in the first entry includes one or more of:
   load on the first computing system;
   bandwidth of the links coupled to the first computing system;
   a hop count between the first switch and the first computing system; and
   a user-defined parameter.

3. The first computing system of claim 1, wherein a packet header of the notification message is based on a reliable network protocol.

4. The first computing system of claim 1, wherein the method further comprises identifying a virtual identifier in a packet header, wherein the virtual identifier comprises one or more of:
   a virtual Internet Protocol (IP) address; and
   a virtual Media Access Control (MAC) address.

5. The first computing system of claim 4, wherein the virtual identifier is assigned to the first computing system and the second computing system.

6. The first computing system of claim 4, wherein the method further comprises responding to an Address Resolution Protocol (ARP) request for the virtual IP address with an ARP response comprising the virtual MAC address.

7. The first computing system of claim 4, wherein the method further comprises:
   obtaining a group license for the first switch; and
   constructing a frame comprising the group license, wherein the frame is destined for the first switch.

8. The first computing system of claim 1, wherein the method further comprises assigning a unique identifier to the first switch from a range of identifiers specific to the first computing system.

9. The first computing system of claim 1, wherein the method further comprises managing a second switch in response to detecting a failure of the second computing system, wherein the second switch is previously managed by the second computing system.

10. The first computing system of claim 1, wherein the method further comprises creating a multicast group, wherein a respective member of the multicast group is managed by the first computing system.

11. A computer-executable method, comprising:
    determining, by a first computing system, discovery information of a first switch from a discovery response packet, wherein the discovery response packet is a multicast packet destined to a multicast group which includes the first switch and the first computing system, and wherein a multicast group is associated with a multicast distribution tree via which a multicast packet destined for the multicast group is distributed;
    storing the discovery information of the first switch in a first entry of a first client database in the first computing system;
    obtaining discovery information of the first switch from a notification message comprising a second entry of a second client database of a second computing system; and
    determining whether the first computing system is to manage the first switch based on the discovery information of the first switch from the first and second entries, wherein managing a switch includes configuring the switch.

12. The method of claim 11, wherein the discovery information of the first switch in the first entry includes one or more of:
    load on the first computing system;
    bandwidth of the links coupled to the first computing system;
    a hop count between the first switch and the first computing system; and
    a user-defined parameter.

13. The method of claim 11, wherein a packet header of the notification message is based on a reliable network protocol.

14. The method of claim 11, further comprising identifying a virtual identifier in a packet header, wherein the virtual identifier comprises one or more of:
    a virtual Internet Protocol (IP) address; and
    a virtual Media Access Control (MAC) address.

15. The method of claim 14, wherein the virtual identifier is assigned to the first computing system and the second computing system.

16. The method of claim 14, further comprising responding to an Address Resolution Protocol (ARP) request for the virtual IP address with an ARP response comprising the virtual MAC address.

17. The method of claim 11, further comprising:
    obtaining a group license for the first switch; and
    constructing a frame comprising the group license, wherein the frame is destined for the first switch.

18. The method of claim 11, further comprising assigning a unique identifier to the first switch from a range of identifiers specific to the first computing system.

19. The method of claim 11, further comprising managing a second switch in response to detecting a failure of the second computing system, wherein the second switch is previously managed by the second computing system.

20. The method of claim 11, further comprising creating a multicast group, wherein a respective member of the multicast group is managed by the first computing system.

21. A non-transitory computer-readable storage medium storing instructions that when executed by a first computing system cause the first computing system to perform a method for managing a group of switches, the method comprising:
- determining discovery information of a first switch from a discovery response packet, wherein the discovery response packet is a multicast packet destined to a multicast group which includes the first switch and the first computing system, and wherein a multicast group is associated with a multicast distribution tree via which a multicast packet destined for the multicast group is distributed;
- storing the discovery information of the first switch in a first entry of a first client database in the first computing system;
- obtaining discovery information of the first switch from a notification message comprising a second entry of a second client database of a second computing system; and
- determining whether the first computing system is to manage the first switch based on the discovery information of the first switch from the first and second entries, wherein managing a switch includes configuring the switch.

22. The storage medium of claim 21, wherein the discovery information of the first switch in the first entry includes one or more of:
- load on the first computing system;
- bandwidth of the links coupled to the first computing system;
- a hop count between the first switch and the first computing system; and
- a user-defined parameter.

23. The storage medium of claim 21, wherein a packet header of the notification message is based on a reliable network protocol.

24. The storage medium of claim 21, wherein the method further comprises identifying a virtual identifier in a packet header, wherein the virtual identifier comprises one or more of:
- a virtual Internet Protocol (IP) address; and
- a virtual Media Access Control (MAC) address.

25. The storage medium of claim 24, wherein the virtual identifier is assigned to the first computing system and the second computing system.

26. The storage medium of claim 24, wherein the method further comprises responding to an Address Resolution Protocol (ARP) request for the virtual IP address with an ARP response comprising the virtual MAC address.

27. The storage medium of claim 21, wherein the method further comprises:
- obtaining a group license for the first switch; and
- constructing a frame comprising the group license, wherein the frame is destined for the first switch.

28. The storage medium of claim 21, wherein the method further comprises assigning a unique identifier to the first switch from a range of identifiers specific to the first computing system.

29. The storage medium of claim 21, wherein the method further comprises managing a second switch in response to detecting a failure of the second computing system, wherein the second switch is previously managed by the second computing system.

30. The storage medium of claim 21, wherein the method further comprises creating a multicast group, wherein a respective member of the multicast group is managed by the first computing system.

* * * * *